United States Patent [19]

Schwerzel et al.

[11] Patent Number: 5,290,832
[45] Date of Patent: Mar. 1, 1994

[54] MOLDINGS

[75] Inventors: Thomas Schwerzel, Meckenheim; Kurt Wendel, Ludwigshafen; Thomas Anselmann, Landau; Ruediger Fuessl, Neustadt, all of Fed. Rep. of Germany

[73] Assignee: BASF Aktiengesellschaft, Ludwigshafen, Fed. Rep. of Germany

[21] Appl. No.: 957,167

[22] Filed: Oct. 7, 1992

[30] Foreign Application Priority Data

Oct. 7, 1991 [DE] Fed. Rep. of Germany ........ 4133190

[51] Int. Cl.$^5$ ............................ C08K 5/15; C08L 5/00
[52] U.S. Cl. ........................................ 524/56; 524/54; 524/57; 524/58; 524/458
[58] Field of Search .................................. 524/56-58, 524/47-48, 50, 54, 458, 443, 446, 447; 523/139

[56] References Cited

U.S. PATENT DOCUMENTS 3,947,392  3/1976  Lang et al. ............................ 524/47

FOREIGN PATENT DOCUMENTS 51-93722  8/1976  Japan .

OTHER PUBLICATIONS

Gunther Tegge, Starke und Starkederivate, 1984, pp. 209-210. Not translated to English.

*Primary Examiner*—Paul R. Michl
*Assistant Examiner*—La Vonda DeWitt
*Attorney, Agent, or Firm*—Oblon, Spivak, McClelland, Maier & Neustadt

[57] ABSTRACT

A molding based on finely divided organic and/or inorganic materials containing, as binder, the solid component of an aqueous polymer dispersion which is obtainable by polymerizing unsaturated monomers which can be polymerized by means of free radicals in the aqueous phase in the presence of a monosaccharide, oligosaccharide, polysaccharide, oxidatively, hydrolytically and/or enzymatically degraded polysaccharide, chemically modified monosaccharide, oligosaccharide or polysaccharide, or a mixture of the said compounds, by the process of free-radical aqueous emulsion polymerization.

12 Claims, No Drawings

MOLDINGS

The present invention relates to moldings based on finely divided organic and/or inorganic materials containing, as binder, the solid component of an aqueous polymer dispersion which is obtainable by polymerizing unsaturated monomers which can be polymerized by means of free radicals in the aqueous phase in the presence of a monosaccharide, oligosaccharide, polysaccharide, oxidatively, hydrolytically and/or enzymatically degraded polysaccharide, chemically modified monosaccharide, oligosaccharide or polysaccharide, or a mixture of the said compounds, by the process of free-radical aqueous emulsion polymerization. The present invention furthermore relates to a process for the production of such moldings and to the use thereof.

JP-A 76/93722 discloses that foundry sand for the production of moldings for metal casting can be bound by means of an emulsion polymer comprising 52% by weight of styrene, 44% by weight of n-butyl acrylate and 4% by weight of methacrylic acid. The moldings obtainable in this way have the disadvantage that their intrinsic strength is not entirely satisfactory at elevated temperatures, as are conventional for metal casting. Günther Tegge, Stärke und Stärkederivate, Behr's Verlag, Hamburg, 1984, recommends swollen starches, phosphated starches and degraded starches per se as binders for foundry sand for the production of moldings for metal casting. The moldings obtainable in this way have the disadvantage that their intrinsic strength is not entirely satisfactory even at room temperature.

It is an object of the present invention to provide moldings based on finely divided organic and/or inorganic materials which have increased intrinsic strength, in particular at elevated temperature, and are suitable, in particular, as molds for metal castings.

We have found that this object is achieved by the moldings defined at the outset.

Particularly suitable finely divided starting materials are fibrous materials,, such as wood turnings (for example for the production of chipboard), paper shavings (for example for the production of insulating boards for ingot molds), synthetic fibers, for example based on polyester, polypropylene or polyurethane, carbon fibers, mineral fibers, such as mineral wool, for example basalt wool, glass fibers and non-fibrous materials, such as sands, kaolins, ground slate, colored and white pigments or fillers. Particularly suitable foundry sands generally comprise granular quartz sand, in certain cases also chromite, zirconium or olivine sand. In addition, fireclay, magnesite, sillimanite or corundum materials are also used. The mean particle diameter (maximum diameter) is normally from 0.05 to 0.6 mm.

Suitable monomers which can be polymerized by means of free radicals include, in particular, monoethylenically unsaturated monomers, such as olefins, eg. ethylene, vinylaromatic monomers, such as styrene, α-methylstyrene, o-chlorostyrene and vinyltoluenes, vinyl and vinylidene halides, such as vinyl chloride and vinylidene chloride, esters made from vinyl alcohol and monocarboxylic acids having 1 to 18 carbon atoms, such as vinyl acetate, vinyl propionate, vinyl n-butyrate, vinyl laurate and vinyl stearate, esters made from $\alpha,\beta$-monoethylenically unsaturated mono- and dicarboxylic acids, preferably having 3 to 6 carbon atoms, such as, in particular, acrylic acid, methacrylic acid, maleic acid, fumaric acid and itaconic acid, with alkanols generally having from 1 to 12, preferably from 1 to 8, in particular from 1 to 4, carbon atoms, such as, in particular, methyl, ethyl, n-butyl, isobutyl and 2-ethylhexyl acrylates and methacrylates, dimethyl maleate and n-butyl maleate, nitriles of $\alpha,\beta$-monoethylenically unsaturated carboxylic acids, such as acrylonitrile, and $C_{4-8}$, conjugated dienes, such as 1,3-butadiene and isoprene. Said monomers are essentially insoluble in aqueous media and generally form the principal monomers, which normally make up a proportion of greater than 50% by weight, based on the total amount of monomers to be polymerized. Monomers which, when polymerized alone, usually give homopolymers of increased water solubility are normally only copolymerized as modifying monomers in amounts, based on the total amount of monomers to be polymerized, of less than 50% by weight, in general from 0.5 to 20% by weight, preferably from 1 to 10% by weight.

Examples of such monomers are $\alpha,\beta$-monoethylenically unsaturated mono- and dicarboxylic acids having 3 to 6 carbon atoms, and amides thereof, eg. acrylic acid, methacrylic acid, maleic acid, fumaric acid, itaconic acid, acrylamide and methacrylamide, furthermore vinylsulfonic acid and water-soluble salts thereof, and N-vinylpyrrolidone. Monomers which usually increase the intrinsic strength of films formed by the aqueous polymer dispersion are generally likewise only copolymerized in minor amounts, usually from 0.5 to 10% by weight, based on the total amount of monomers to be polymerized. Such monomers normally contain an epoxide, hydroxyl, N-methylol or carbonyl group or at least two non-conjugated ethylenically unsaturated double bonds. Examples of this are N-alkylolamides of $\alpha,\beta$-monoethylenically unsaturated carboxylic acids having 3 to 10 carbon atoms and esters thereof with alkohols having 1 to 4 carbon atoms, of which N-methylolacrylamide and N-methylolmethacrylamide are very particularly preferred, monomers containing two vinyl radicals, monomers containing two vinylidene radicals, and monomers containing two alkenyl radicals. Particularly suitable here are diesters of dihydric alcohols with $\alpha,\beta$-monoethylenically unsaturated monocarboxylic acids, of which in turn acrylic acid and methacrylic acid are preferably employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In addition to monomers containing unsaturated double bonds, it is also possible to copolymerize minor amounts, usually from 0.01 to 4% by weight, based on the monomers to be polymerized, of molecular weight regulators, such as tert-dodecyl mercaptan. Such substances are preferably added to the polymerization zone in a mixture with the monomers to be polymerized.

Preferred classes of aqueous polymer dispersions according to the invention are those whose polymers are obtainable by free-radical polymerization of monomer mixtures which comprise from 50 to 100% by weight of esters of acrylic and/or methacrylic acid with alkanols having 1 to 12 carbon atoms and/or styrene (class I) or from 70 to 100% by weight of styrene and/or butadiene (class II) or from 70 to 100% by weight of vinyl chloride and/or vinylidene chloride (class III), class I being particularly preferred and preferably covering the following monomer compositions:

from 90 to 99% by weight of esters of acrylic and/or methacrylic acid with alkanols having 1 to 8 carbon atoms and/or styrene, and from 1 to 10% by weight of acrylic acid, methacrylic acid or a mixture thereof.

Of very particular interest are the following monomer compositions:

from 90 to 99% by weight of n-butyl acrylate and/or styrene, from 1 to 10% by weight of acrylic acid and/or methacrylic acid.

Said monomers are polymerized according to the invention by free-radical aqueous emulsion polymerization in the presence of polysaccharides, oligosaccharides, monosaccharides and/or derivatives thereof. They may be of vegetable or animal origin, soluble in water or only dispersible therein. Suitable compounds include swollen starches, which are obtainable, for example, by hydrothermal treatment of native starch. Soluble starches are furthermore suitable. These are starches which have been slightly degraded by means of acids or enzymes or have been oxidized by means of mild oxidants, and, even in relatively high concentrations, do not give viscous pastes on boiling with water, but instead give relatively thin liquids. Also suitable are acid-modified starches obtained by warming an aqueous starch suspension at below the gelatinization temperature in the presence of small amounts of acid. Also suitable are oxidatively modified starches. Examples of oxidants which can be used are chromic acid, permanganate, hydrogen peroxide, nitrogen dioxide, hypochlorite and periodic acid. Suitable starting starches are in principle all native starches, such as cereal starches (eg. corn, wheat, rice or barley), tuber and root starches (eg. potatoes, tapioca root or arrowroot) or sago starches. It is particularly advantageous to use roast dextrins, as described, for example, in EP-A 408 099 and EP-A 334 515. They can be obtained by heating moist-dry starch, usually in the presence of small amounts of acid. Examples of typical roast dextrins are the commercially available white and yellow dextrins, and furthermore the dextrins marketed under the trade names Noredux ® and Tackidex ®. The term dextrin here is used very generally for starch degradation products. However, it is very particularly advantageous to carry out the free-radical emulsion polymerization in the presence of sugared starches. These are starch degradation products obtainable by hydrolysis in the aqueous phase and preferably having a weight average molecular weight $M_w$ of from 2500 to 25000. Details on the preparation of said starches and starch derivatives are given in G. Tegge, Stärke und Stärkederivate, Behr's Verlag, Hamburg, 1984. It is of course possible to carry out the invention using said starches and starch derivatives in chemically modified form, for example modified by etherification or esterification.

This chemical modification can be carried out on the starting starch even before its degradation or thereafter. Esterification reactions are possible using either inorganic or organic acids, or the anhydrides or chlorides thereof. Of particular interest are phosphated and acetylated derivatives. The most common etherification method is treatment with organic halogen compounds, epoxides or sulfates in aqueous alkaline solution. Particularly suitable ethers are alkyl ethers, hydroxyalkyl ethers, carboxyalkyl ethers and allyl ethers. Also suitable are cyanoalkylated derivatives and products of the reaction with 2,3-epoxypropyltrimethylammonium chloride. Chemically unmodified products are preferred. Of course, monosaccharides and oligosaccharides and products of the degradation of cellulose, for example cellobiose and oligomers thereof, are also suitable.

The sugared starches having a weight average molecular weight of from 2500 to 25000 very particularly preferably to be used according to the invention are commercially available as such (for example the C* PUR Products 01906, 01908, 01910, 01912, 01915, 01921, 01924, 01932 and 01934 from Cerestar Deutschland GmbH, D-4150 Krefeld 12). Sugared starches of this type differ chemically from roast dextrins through the fact, inter alia, that recombination and branching are essentially impossible, evident not least in different molecular weight distributions, on hydrolytic degradation in an aqueous medium (usually suspensions or solutions), which is generally carried out at solids contents of from 10 to 30% by weight and preferably with acid or enzyme catalysis. Thus, sugared starches which have a bimodal molecular weight distribution have proven particularly advantageous according to the invention. The preparation of sugared starches is generally known and is described, inter alia, in Günther Tegge, Stärke und Stärkederivate, Behr's Verlag, Hamburg 1984, p. 173 and p. 220 ff. and in EP-A 441 197. The sugared starches to be used according to the invention are preferably those whose weight average molecular weight $M_w$ is in the range from 4000 to 16000, particularly preferably in the range from 6500 to 13000.

The sugared starches to be used according to the invention are normally completely soluble in water at room temperature, the solubility limit generally being above 50% by weight, which proves particularly advantageous for the preparation of the aqueous polymer dispersions according to the invention.

It has furthermore proven favorable for the sugared starches to be used according to the invention to have a nonuniformity U (defined as the ratio between the weight average molecular weight $M_w$ and the number average molecular weight $M_n$; U characterizes the molecular weight distribution) in the range from 6 to 12. U is particularly advantageously from 7 to 11 and very particularly advantageously from 8 to 10.

It is furthermore advantageous for the proportion by weight of the sugared starches having a molecular weight of below 1000 to be used according to the invention to be at least 10% by weight, but not more than 70% by weight. This proportion by weight is particularly preferably in the range from 20 to 40% by weight.

It is furthermore advisable to use sugared starches to be used according to the invention whose dextrose equivalent DE is from 5 to 40, preferably from 10 to 30, particularly preferably from 10 to 20. The DE value characterizes the reduction capacity, relative to the reduction capacity of anhydrous dextrose, and is determined in accordance with DIN 10308, Edition 5.71, produced by the German Standards Committee on Foodstuffs and Agricultural Products (cf. also Günther Tegge, Stärke und Stärkederivate, Behr's Verlag, Hamburg 1984, p. 305).

It has also been found that aqueous polymer dispersions which have a particularly favorable property profile are obtained if sugared starches to be used according to the invention are used whose 40% strength by weight aqueous solutions have a dynamic viscosity $\eta^{40}$ [Pa.s], determined in accordance with DIN 53 019 at 25° C. and a shear gradient of 75 s$^{-1}$, of from 0.01 to 0.06, preferably from 0.015 to 0.04, particularly preferably from 0.02 to 0.035.

It should be noted at this point that molecular weight data for saccharides and derivatives thereof to be used according to the invention are based in this publication, unless expressly stated otherwise, on determinations by means of gel permeation chromatography, carried out under the following conditions:

- Columns: 3 steel units measuring 7.5×600 Mm, filled with TSK gel G 2000 PW; G 3000 PW and G 4000 PW. Mesh 5 $\mu$m
- Eluent: Distilled water
- Temp.: RT (room temperature)
- Detection: Differential refractometer (for example ERC 7511)
- Flow rate: 0.8 ml/min., pump (for example ERC 64.00)
- Injection vol.: 20 $\mu$l, valve (for example VICI 6-way valve)
- Evaluation: Bruker Chromstar GPC software
- Calibration: The calibration was carried out in the low-molecular-weight range using glucose, raffinose, maltose and maltopentose. For the higher-molecular-weight range, pullulan standards having a polydispersity<1.2 were used.

The monosaccharides, oligosaccharides and polysaccharides and/or derivatives thereof present according to the invention during the free-radical aqueous emulsion polymerization may be present either as the only dispersants or in a mixture with other surfactants. If they are employed as the only dispersants, they are normally present in the aqueous polymer dispersions according to the invention in amounts of from 1 to 120% by weight, based on the amount of monomers to be polymerized.

Suitable secondary surfactants are in principle the protective colloids and emulsifiers otherwise usually employed as dispersants. A detailed description of suitable protective colloids is given in Houben-Weyl, Methoden der organischen Chemie, Volume XIV/1, Makromolekulare Stoffe, Georg-Thieme-Verlag, Stuttgart, 1961, pp. 411 to 420. Suitable secondary emulsifiers are anionic, cationic and nonionic emulsifiers. It is preferred for the secondary surfactants to be exclusively emulsifiers, whose relative molecular weights, in contrast to the protective colloids, are usually below 2000. It is of course necessary, if mixtures of surfactants are used, for the individual components to be compatible with one another, which can be checked in case of doubt by means of a few preliminary experiments. The secondary surfactants used are preferably anionic and nonionic emulsifiers. Examples of customary secondary emulsifiers are ethoxylated fatty alcohols (degree of ethoxylation from 3 to 50, $C_8$- to $C_{36}$-alkyl radical), ethoxylated mono-, di- and trialkylphenols (degree of ethoxylation from 3 to 50, $C_4$-to $C_9$-alkyl radical), alkali metal salts of dialkyl esters of sulfosuccinic acid and alkali metal and ammonium salts of alkyl sulfates ($C_8$- to $C_{12}$-alkyl radical), of ethoxylated alkanols (degree of ethoxylation from 4 to 30, $C_{12}$-to $C_{18}$-alkyl radical), of ethoxylated alkylphenols (degree of ethoxylation from 3 to 50, $C_4$- to $C_9$-alkyl radical), of alkylsulfonic acids ($C_{12}$- to $C_{18}$-alkyl radical) and of alkylarylsulfonic acids ($C_9$- to $C_{18}$-alkyl radical). Further suitable emulsifiers are given in Houben-Weyl, Methoden der organischen Chemie, Volume XIV/1, Makromolekulare Stoffe., Georg Thieme Verlag, Stuttgart, 1961, pages 192 to 208. Secondary surfactants are generally used in amounts of up to 5% by weight, based on the amount of monomers to be polymerized.

The emulsion polymerization temperature is generally from 30° to 95° C., preferably from 75° to 90° C. The polymerization medium may either comprise water alone or a mixture of water and water-miscible liquids, such as methanol. It is preferred to use water alone. The emulsion polymerization can be carried out either as a batch process or in the form of a feed process, including a step or gradient procedure. Preference is given to the feed process, in which part of the polymerization batch is heated to the polymerization temperature and partially polymerized, and the remainder of the polymerization batch is subsequently fed to the polymerization zone continuously, in steps or with superposition of a concentration gradient, usually via a plurality of spatially separate feed streams, of which one or more contain the monomers in pure or emulsified form, while maintaining the polymerization. In an applicationally advantageous manner, the initially introduced mixture and/or the monomer feed stream contains small amounts of emulsifiers, generally less than 0.5% by weight, based on the total amount of monomers to be polymerized, in order to reduce the surface tension of the dispersion medium and thus to simplify stirring in. The monomers are therefore frequently fed to the polymerization zone after preemulsification with these assistant emulsifiers. It is advantageous for all the monosaccharide, oligosaccharide or polysaccharide and/or derivatives thereof to be present in an aqueous mixture.

Suitable free-radical polymerization initiators are all those which are capable of initiating a free-radical aqueous emulsion polymerization. These may be either peroxides, for example alkali metal peroxydisulfcites or $H_2O_2$ or azo compounds.

Also suitable are combined systems comprising at least one organic reducing agent and at least one peroxide and/or hydroperoxide, eg. tert-butyl hydroperoxide and the sodium metal salt of hydroxymethanesulfinic acid or hydrogen peroxide and ascorbic acid. Also suitable are combined systems additionally containing a small amount of a metal compound which is soluble in the polymerization medium and whose metallic component can exist in more than one oxidation state, eg. ascorbic acid/iron(II) sulfate/hydrogen peroxide, where ascorbic acid is also frequently replaced by the sodium metal salt of hydroxymethanesulfinic acid, sodium sulfite, sodium hydrogen sulfite or sodium metal bisulfite and hydrogen peroxide is frequently replaced by tert-butyl hydroperoxide or alkali metal peroxydisulfates and/or ammonium peroxydisulfates. In the combined systems, it is furthermore expedient to use the sugared starches as the reducing component. In general, the amount of free-radical initiator systems employed is from 0.1 to 2% by weight, based on the total amount of the monomers to be polymerized. Particularly preferred initiators are ammonium and/or alkali metal peroxydisulfates, alone or as a constituent of combined systems. Particular preference is given to sodium peroxydisulfate.

The manner in which the f reenradical initiator system is added to the polymerization reactor during the free-radical aqueous emulsion polymerization according to the invention is of somewhat secondary importance. It can either all be introduced into the polymerization reactor at the beginning, or added continuously or stepwise as it is consumed during the free-radical aqueous emulsion polymerization. In detail, this depends in a manner known to an average person skilled in the art both on the chemical nature of the initiator system and on the polymerization temperature. In a preferred procedure, some is introduced at the beginning and the remainder is added to the polymerization zone as it is consumed.

It is of course also possible to carry out the free-radical aqueous emulsion polymerization according to the invention under superatmospheric or reduced pressure.

The aqueous polymer dispersions according to the invention are generally prepared with total solids contents of from 15 to 65% by weight, particular preference being given for applicational reasons to those which contain from 10 to 75% by weight, very particularly preferably from 20 to 60% by weight, based on the monomers to be polymerized, of monosaccharides, oligosaccharides or polysaccharides and/or derivatives thereof to be used according to the invention.

Binders for foundry sands which are suitable in a very particularly advantageous manner for the production of molds for metal casting are aqueous polymer dispersions according to the invention whose polymers are obtainable by free-radical polymerization of monomer mixtures which have the following monomer composition, comprising

- from 39 to 69% by weight of at least one ester of $\alpha,\beta$-monoethylenically unsaturated mono- and dicarboxylic acids having 3 to 6 carbon atoms with alkanols having 1 to 6 carbon atoms (monomers a),
- from 30 to 60% by weight of styrene (monomer b),
- from 1 to 10% by weight of at least one monomer from the group comprising $\alpha,\beta$-monoethylenically unsaturated carboxylic acids having 3 to 6 carbon atoms, and amides and nitriles thereof, (monomers c) and
- from 0 to 10% by weight of one or more monomers from the group comprising N-alkylolamides of $\alpha,\beta$-monoethylenically unsaturated carboxylic acids having 3 to 6 carbon atoms, with 1 to 4 carbon atoms in the alkyl group, and monomers having up to 25 carbon atoms and containing two non-conjugated, ethylenically-unsaturated double bonds (monomers d), and which contain, based on the monomers to be polymerized, from 1 to 120% by weight, preferably from 10 to 65% by weight, particularly preferably from 35 to 55% by weight, of monosaccharides, oligosaccharides or polysaccharides and/or derivatives thereof. It is of course possible for all or some of the monomers to be replaced by other crosslinking monomers mentioned in this publication.

Conversion of the foundry sands to foundry moldings which can be used as foundry molds is generally carried out, as in the case of the other finely divided materials, by mixing the finely divided materials with the aqueous polymer dispersions to be used according to the invention while establishing the desired binder content, in general (calculated in dry form) from 0.1 to 10% by weight, preferably from 0.1 to 5% by weight, based on the amount of finely divided starting material, shaping the mixture (referred to here as mortar) (eg. in a mold (negative)), if desired after adding known assistants, if desired compacting the material by exerting pressure, and subsequently curing the material.

It is noteworthy that, on use of the aqueous polymer dispersions according to the invention, which are usually used for this purpose with a total solids content of from 40 to 60% by weight, the curing process does not necessarily require the use of elevated temperatures (normally from 50° to 250° C.), but thorough curing also takes place at a satisfactory rate when left to itself at room temperature. The curing can also be achieved in an applicationally particularly elegant manner by exposing the material to be cured to the action of microwaves. In this respect, aqueous polymer dispersions according to the invention which are obtainable by free-radical Aqueous emulsion polymerization of mixtures of monomers a, b, c and d whose monomer composition is selected so that a polymer built up only from monomers a, b and c would have a glass transition temperature in the range from 0° to 40° C., are recommended with particular advantage.

According to Fox (T. G. Fox, Bull. Am. Phys. Soc. (Ser. II) 1 (1956) 123), the glass transition temperature of copolymers is given, to a close approximation, by:

$$\frac{1}{Tg} = \frac{X^1}{Tg^1} + \frac{X^2}{Tg^2} + \ldots \frac{X^s}{Tg^s}$$

where $X^1, X^2, \ldots, X^s$ denote the proportions by weight of monomers $1, 2, \ldots, s$, and $Tg^1, Tg^2, \ldots, Tg^2$ denote the glass transition temperatures of the respective polymers built up only from one of the monomers $1, 2, \ldots, s$, in Kelvin. The glass transition temperatures of the monomers a, b and c are essentially known and are listed, for example, in J. Brandrup, E. H. Immergut, Polymer Handbook, 1st Edn., J. Wiley, New York 1966, and 2nd Edn., J. Wiley, New York 1975.

A further advantage of the use of the aqueous polymer dispersion according to the invention is that the cured molding, as a measure of its intrinsic strength, has increased flexural strength, in particular at elevated temperature. This ensures increased dimensional stability, above all at elevated temperature in particular in the presence of hot molten metal. Furthermore, the negative mold is simple to clean with water after removal of the molding, and the molding itself can, if required, be converted back into uncured mortar by adding water (redispersibility is usually good), which is equivalent to an infinitely long processibility of the mortar. If the polymers also contain incorporated monomers d, particularly high flexural strengths result. In addition, the flexural strengths can be further increased by adding up to 20% by weight, based on the polymerized monomers, of saturated dialdehydes, preferably those of the formula I

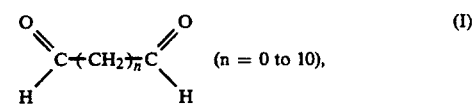

before the aqueous polymer dispersions to be used according to the invention are used, dialdehydes of the formula I where n=0 to 2 being preferred. Other suitable additives for increasing the flexural strength are condensation products based on formaldehyde, melamine, phenol and/or urea, eg. Urecoll® 118. The amounts to be used can be up to 250% by weight, based on the solids content of the aqueous polymer dispersions according to the invention determined without the sugared starch.

However, the last-mentioned additives only have an advantageous effect in the manner described if the curing is carried out at elevated temperature, in general from 100° to 250° C., or in the presence of acid. The latter can be achieved in a simple manner by adjusting the pH of the dispersion medium of the aqueous polymer dispersions to be used according to the invention to from 1 to 5, preferably to from 2 to 3. If flexural strengths within usual limits are required, it is preferred to use no additives.

The moldings obtainable on use of foundry sands and which can be used as casting molds have, as further properties:
good resistance to erosion by molten metal
smooth and closed surfaces of the casting
good release after casting.
minimal subsequent cleaning for the castings
minimal evolution of toxic gases during casting.

EXAMPLES

1) Preparation of aqueous polymer dispersions to be used according to the invention A mixture of
400 g of water,
200 g of sugared starch C* PUR 01910
71 g of feed 1 and
10 g of feed 2
was heated to 85° C. and kept at this temperature for 15 minutes. The remainders of feeds 1 and 2 were subsequently fed continuously to the polymerization zone beginning at the same time (feed 1 over the course of 2.5 hours, feed 2 over the course of 3 hours) while maintaining the temperature of 85° C. The mixture was subsequently polymerized for a further hour (85° C.) and then cooled to room temperature. The total solids content of the resultant aqueous polymer dispersion was about 50% by weight.

Feed 1:
275 g of n-butyl acrylate
215 g of styrene
10 g of acrylic acid
preemulsified in 204 g of water by means of 0.5 g of the sodium salt of dodecylbenzenesulfonic acid.

Feed 2:

2.5 g of sodium peroxidisulfate dissolve in 100 g of water.

2) Moldings According to the Invention 1000 g of quartz sand H 33 were mixed with various amounts (indicated in the Table in % by weight, based on sand, calculated in dry form) of novel, C* PUR 01910-containing, aqueous polymer dispersions having a total solids content of 50% by weight, to which in some cases 0.125 part by weight of glyoxal or 1.075 parts by weight of Urecoll 118 had been added per part by weight of sugared starch present.

The mixture was subsequently introduced into a mold and compacted three times by means of a ram (G. Fischer AG, Schaffhausen, Switzerland) having a weight of 6.7 kg from a fall height of 5 cm. The resultant moldings (Fischer bars) had the following dimensions, with rounded ends:
Length about 173 mm
Width about 22 mm
Height about 22 mm.

The bars were then dried under various conditions, and the flexural strengths were subsequently determined at room temperature using a test apparatus from G. Fischer AG (Schaffhausen, Switzerland).

The preparation of the novel aqueous polymer dispersions used corresponded in all cases to Example 1, but in some cases with a different monomer composition and, based on the monomers, different amounts of sugared starch C* Pur 01910. Details and results are shown in the Table. The amounts of starch are in each case based on the total amount of monomers to be polymerized.

The following abbreviations were used for the monomers:
BA = n-butyl acrylate
St = styrene
AA = acrylic acid
MAmol = N-methylolmethacrylamide
BDA = butanediol acrylate
DVB = divinylbenzene

TABLE

| Monomer composition (% by weight) | % by weight of starch | Amount of binder | Glyoxal | Urecoll | Drying time | Temperature (°C.) | Flexural strength (N/mm²) |
| --- | --- | --- | --- | --- | --- | --- | --- |
| 55 BA 43 St 2 AA | 40 | 1 | — | — | 10 min | 150 | 1.8 |
| 55 BA 43 St 2 AA | 40 | 2 | — | — | 10 min | 150 | 4.9 |
| 55 BA 43 St 2 AA | 40 | 3 | — | — | 10 min | 150 | 6.0 |
| 55 BA 43 St 2 AA | 40 | 3 | — | — | 30 min | 150 | 5.8 |
| 55 BA 43 St 2 AA | 40 | 3 | + | — | 30 min | 150 | 6.2 |
| 55 BA 43 St 2 AA | 50 | 2 | — | — | 10 min | 150 | 4.9 |
| 45 BA 43 St 2 AA | 40 | 2 | — | — | 10 min | 150 | 6.2 |
| 65 BA 43 St 2 AA | 40 | 2 | — | — | 10 min | 150 | 3.8 |
| 52 BA 41 St 2 AA 5 MAmol | 50 | 2 | — | — | 10 min | 150 | 4.5 |
| 55 BA 42.5 St 2 AA 0.5 BDA | 50 | 2 | — | — | 10 min | 150 | 5.2 |
| 54 BA 42 St 2 AA 2 DVB | 50 | 2 | — | — | 10 min | 150 | 5.0 |
| 50 BA 45 St 5 AA | 40 | 2 | — | — | 10 min | 150 | 5.2 |
| 45 BA 53 St 5 AA | 40 | 2 | — | + | 10 min | 150 | 8.7 |
| 45 BA 53 St 2 AA | 40 | 2 | — | + | 10 min | 150 | 2.6 (at 200° C.) |
| 55 BA 42.5 St 2 AA 0.5 DVB | 50 | 2 | — | — | 3 min | microwave 1300 W | 5.0 |
| 50 BA 45 St 5 AA | 40 | 2 | — | — | 4 h | 25 | 2.5 |
| 50 BA 45 St 5 AA | 40 | 2 | — | — | 6 h | 25 | 5.1 |

If C* PUR 01910 is replaced by C* PUR 01906, 01908, 01912, 01915, 01921, 01924, 01932 or 01934, results of the same order were obtained. C* PUR 01910 and 01915 proved to be particularly advantageous. The sugared starches mentioned can be characterized as follows:

| Type | $M_w$ | U | % by weight <1000 | DE | $\eta^{40}$ [Pa·s] |
|------|-------|-----|-------------------|-------|--------|
| 01906 | 20080 | 10.9 | 12.2 | 2-5 | — |
| 01908 | 19290 | 10.0 | 15.9 | 8-10 | 0.056 |
| 01910 | 10540-12640 | 8.5-9.9 | 24.7-26.4 | 11-14 | 0.030 |
| 01915 | 6680-8350 | 6.8-8.4 | 32.9-34.7 | 17-19 | 0.021 |
| 01921 | 6700 | 7.4 | 39.1 | 20-23 | 0.017 |
| 01924 | 4730 | 6.8 | 53.6 | 26-30 | 0.014 |
| 01932 | 4500 | 7.9 | 63.2 | 33-35 | 0.011 |
| 01934 | 3000 | 6.0 | 68.4 | 36-39 | 0.009 |

Determination of $M_n$ by means of vapor pressure osmometry gave the following values for the preferred types 01910 and 01915:

1560 g/mol (1910)
980 g/mol (1915)

COMPARATIVE EXAMPLE

Example 2 (drying temperature 150° C., time 10 min) was repeated, but the binder used (2% by weight, based on sand, calculated in dry form) was a conventional 50% strength by weight aqueous dispersion (Va) of the monomer composition 53% by weight of styrene
45% by weight of n-butyl acrylate and
2% by weight of acrylic acid or a 50% strength by weight aqueous solution of C* PUR 01910 (Vb). The flexural strength in case Vb was 0.2 N/mm² at 25° C. and in case Va was approximately 0° at 60° C.

We claim:

1. A molding comprising finely divided organic material, inorganic material or mixtures thereof, and as a binder, the solid component of an aqueous polymer dispersion obtained by free-radical aqueous emulsion polymerization of unsaturated monomers in the presence of at least 20% by weight, based on the unsaturated monomer, of a saccharide selected from the group consisting of a monosaccharide, oligosaccharide, polysaccharide, oxidatively degraded polysaccharide, hydrolytically degraded polysaccharide, enzymatically degraded polysaccharide, chemically modified monosaccharide, chemically modified oligosaccharide, chemically modified polysaccharide and a mixture of said saccharides.

2. The molding composition of claim 1, wherein the saccharide is present in an amount of 20 to 60% by weight, based on the unsaturated monomers.

3. The molding composition of claim 1, wherein the binder is present in an amount of 0.1 to 10% by weight, based on the amount of finely divided material.

4. The molding composition of claim 1, wherein the unsaturated monomers of the aqueous polymer dispersion are selected from the group consisting of
   a. from 50 to 100% by weight of esters of acrylic acid, methacrylic acid or mixtures thereof with alkanols having 1 to 12 carbon atoms, styrene or mixtures thereof,
   b. from 70-100% by weight of styrene, butadiene or mixtures thereof, and
   c. from 70-100% by weight of vinyl chloride, vinylidene chloride or mixtures thereof.

5. The molding composition of claim 1, wherein the unsaturated monomers of the aqueous polymer dispersion are
   from 90-99% by weight of esters of acrylic or methacrylic acid with alkanols having 1 to 8 carbon atoms, styrene or mixtures thereof, and
   from 1 to 10% by weight of acrylic acid, methacrylic acid or mixtures thereof.

6. The molding composition of claim 5, wherein the unsaturated monomers of the aqueous polymer dispersion are
   from 90 to 99% by weight of n-butyl acrylate, styrene or mixtures thereof, and from 1 to 10% by weight of acrylic acid, methacrylic acid or mixtures thereof.

7. The molding composition of claim 1, wherein the unsaturated monomers of the aqueous polymer dispersions are
   a. from 39 to 69% by weight of at least one ester of $\alpha,\beta$-monoethylenically unsaturated mono-and dicarboxylic acids having 3 to 6 carbon atoms with alkanols having 1 to 6 carbon atoms,
   b. from 30 to 60% by weight of styrene,
   c. from 1 to 10% by weight of at least one monomer selected from the group consisting of $\alpha,\beta$-monoethylenically unsaturated carboxylic acids having 3 to 6 carbon atoms, and amides and nitriles thereof, and
   d. from 0 to 10% by weight of one or more monomers selected from the group consisting of N-alkylolamides of $\alpha,\beta$-monoethylenically unsaturated carboxylic acids having 3 to 6 carbon atoms, with 1 to 4 carbon atoms in the alkyl group, and monomers having up to 25 carbon atoms and containing two non-conjugated ethylenically unsaturated double bonds.

8. The molding composition of claim 1, wherein the saccharide is a sugar starch.

9. The molding composition of claim 1, further comprising up to 20% by weight, based on the polymerized monomers of a saturated dialdehyde of the formula

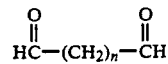

wherein n=0-10.

10. The molding composition of claim 1, further comprising up to 250% by weight, based on the solids content of the aqueous polymer dispersion of a condensation product based on formaldehyde, melamine, phenol, urea or mixtures thereof.

11. The process for the production of a molding as claimed in claim 1, wherein the finely divided organic material, inorganic material or mixtures thereof is mixed with the aqueous polymer dispersion, and the mixture is molded and cured.

12. A method for casting metal, comprising casting the metal in a mold of a molding as claimed in claim 1.

* * * * *